US012790927B2

(12) United States Patent
Lucas et al.

(10) Patent No.: US 12,790,927 B2
(45) Date of Patent: Nov. 10, 2026

(54) BLENDER POWER UNIT FOR ELECTRIC FRACTURING SPREAD

(71) Applicant: Halliburton Energy Services, Inc., Houston, TX (US)

(72) Inventors: Bruce Carl Lucas, Duncan, OK (US); Carlos Alfredo Vallejo Gordon, Houston, TX (US); Mark A Hudson, Duncan, OK (US); Glenn Howard Weightman, Duncan, OK (US); Jose L Maldonado, Houston, TX (US); Austin Carl Schaffner, Duncan, OK (US); John Harold Fischer, Houston, TX (US); Tyler Nolen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 274 days.

(21) Appl. No.: 18/775,640

(22) Filed: Jul. 17, 2024

(65) Prior Publication Data

US 2024/0368974 A1 Nov. 7, 2024

Related U.S. Application Data

(63) Continuation of application No. 17/897,700, filed on Aug. 29, 2022, now Pat. No. 12,071,841.

(51) Int. Cl.
*H02P 1/04* (2006.01)
*B01F 33/502* (2022.01)
(Continued)

(52) U.S. Cl.
CPC ...... *E21B 43/2607* (2020.05); *B01F 33/5026* (2022.01); *H02P 1/04* (2013.01);
(Continued)

(58) Field of Classification Search
CPC .............. E21B 43/2607; B01F 33/5026; B01F 33/805; B01F 2101/49; H02P 1/04; H02P 5/00
See application file for complete search history.

(56) References Cited

U.S. PATENT DOCUMENTS

| | | | | |
|---|---|---|---|---|
| 6,380,708 B1 * | 4/2002 | Gritter | H02P 1/28 | |
| | | | 318/778 | |
| 7,928,685 B2 * | 4/2011 | Dornauer | H01H 9/542 | |
| | | | 361/23 | |

(Continued)

*Primary Examiner* — Thai T Dinh
(74) *Attorney, Agent, or Firm* — Conley Rose, P.C.; Rodney B. Carroll

(57) ABSTRACT

A blender power unit (BPU) for use in fracturing jobs. The BPU comprises a transformer having an input and an output and configured to receive electrical power via the input at a first voltage to output electrical power via the output at a second voltage; a motor power bus coupled to the output of the transformer; a motor starter bus; at least one motor soft starter having an input coupled to the motor power bus and having an coupled to the motor starter bus; a plurality of electric power relays coupled to the motor power bus and configured to supply electric power from the motor power bus to a load when in a closed state; and a plurality of start electric power relays coupled to the motor starter bus and configured to supply electric power from the motor starter bus to a load when in a closed state.

20 Claims, 6 Drawing Sheets

(51) Int. Cl.

| | |
|---|---|
| ***E21B 43/26*** | (2006.01) |
| ***H02P 5/00*** | (2016.01) |
| *B01F 33/80* | (2022.01) |
| *B01F 101/49* | (2022.01) |

(52) U.S. Cl.

CPC .............. *H02P 5/00* (2013.01); *B01F 33/805* (2022.01); *B01F 2101/49* (2022.01)

(56) References Cited

U.S. PATENT DOCUMENTS

| | | | | |
|---|---|---|---|---|
| 10,224,836 | B2 * | 3/2019 | Bachman ................ | H02P 1/028 |
| 10,914,154 | B2 | 2/2021 | Reid et al. | |
| 10,989,031 | B2 | 4/2021 | Fischer et al. | |
| 11,578,577 | B2 | 2/2023 | Hinderliter et al. | |
| 12,071,841 | B2 | 8/2024 | Lucas et al. | |
| 2020/0263527 | A1 | 8/2020 | Fischer et al. | |
| 2021/0062596 | A1 | 3/2021 | Fischer et al. | |
| 2021/0246773 | A1 | 8/2021 | Fischer et al. | |

* cited by examiner

BLENDER POWER UNIT FOR ELECTRIC FRACTURING SPREAD

CROSS-REFERENCE TO RELATED APPLICATIONS

The present application is a continuation of and claims priority to U.S. patent application Ser. No. 17/897,700 filed Aug. 29, 2022 which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wellbores may be drilled into subterranean formations in the earth to extract desired reservoir fluids such as crude oil, natural gas, and/or other hydrocarbons. Desired reservoir fluids in some cases may be hot water for geothermal surface applications. In some cases, the drilled wellbores may be stimulated in one or more ways, such as by conducting a hydraulic fracturing job and/or by treating the wellbore with acid fluids.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
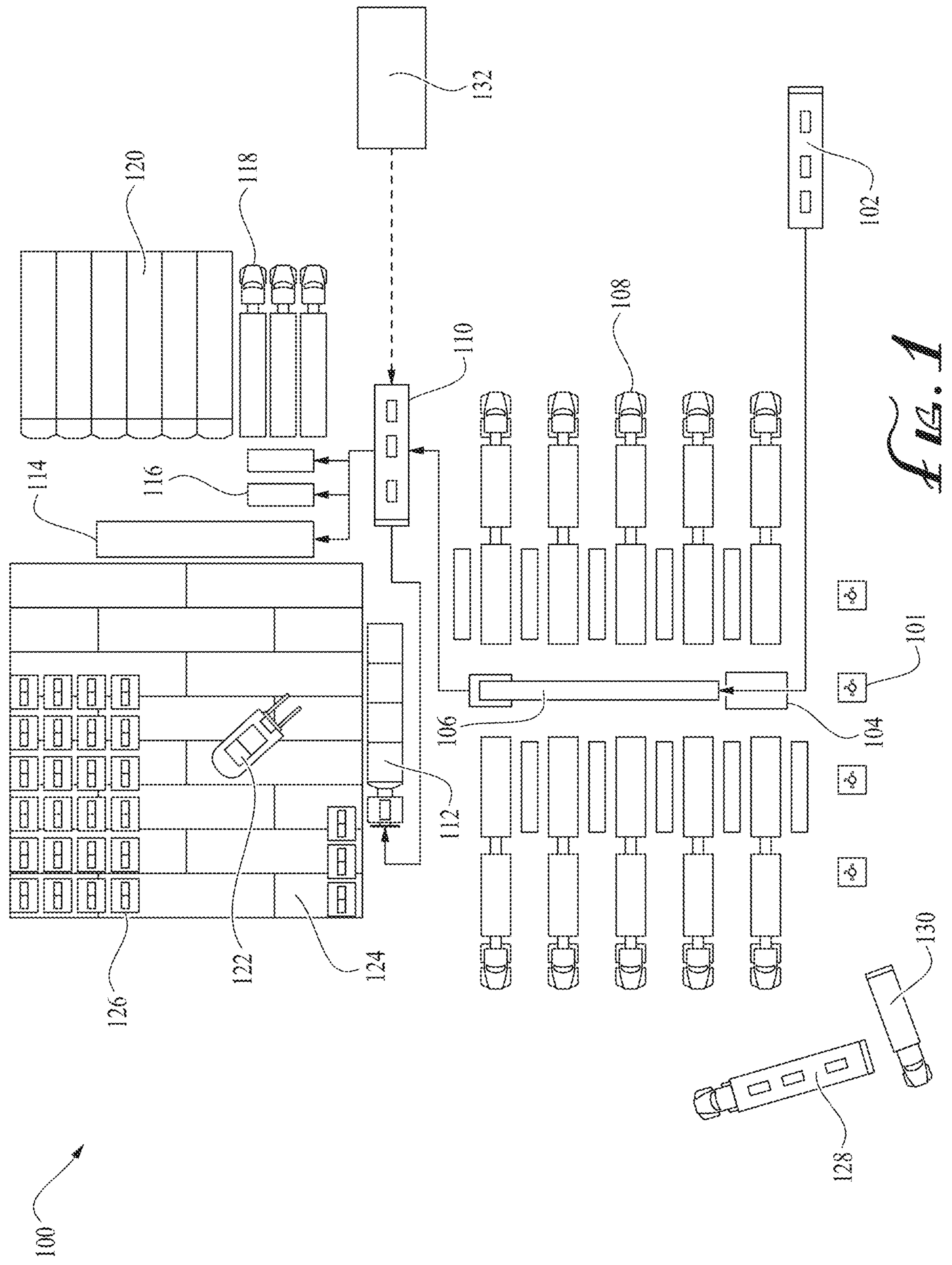
FIG. 1 is an illustration of a fracturing well stimulation job equipment spread according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

As used herein, orientation terms “upstream,” “downstream,” “up,” and “down” are defined relative to the direction of flow of well fluid in the well casing. “Upstream” is directed counter to the direction of flow of well fluid, towards the source of well fluid (e.g., towards perforations in well casing through which hydrocarbons flow out of a subterranean formation and into the casing). “Downstream” is directed in the direction of flow of well fluid, away from the source of well fluid. “Down” is directed counter to the direction of flow of well fluid, towards the source of well fluid. “Up” is directed in the direction of flow of well fluid, away from the source of well fluid.

The disclosure teaches a blender power unit (BPU) for use in well stimulation jobs, such as fracturing jobs and/or acidation jobs. Fracturing equipment spreads are becoming increasingly large and increasingly are using electric power as the primary energy source for operating pumps and other equipment. In the past, electric power cables have been routed from a power distribution unit (PDU) to each of the main electric power consuming motors. The large number of electric power cables involved has become a problem. The BPU disclosed herein addresses this problem by receiving power from a single electric power cable and distributing power to a plurality of electric motors related to blending pumps and fracturing fluid pumps. The BPU can be powered by one electric power input cable and can supply electric power to four or more blender pump motors, reducing the number of cables needed to be run from the PDU.

In an embodiment, the BPU can receive electric power from any electric power source, such as from an electric grid power or from an in-field electric generator driven by a combustion driven prime mover. In this case, the motors driving the fracturing pumps may be conventional diesel motors, for example in cases where an energy company is averse to adopting the use of electric power for operating the fracturing pumps. Said in other words, the BPU disclosed herein provides both the advantage of reducing cables connecting to a PDU when a PDU is the source of power to operate a fracturing spread and the advantage of allowing independent electric power sourcing for blender pumps when conventional diesel power is used to drive the fracturing pumps.

In an embodiment, the BPU comprises a transformer that receives electric power at a first voltage level and outputs electric power at a second voltage level (typically a stepped-down voltage level) to a motor power bus. The motor power bus is connected to one or more motor soft starters, and the one or more motor soft starters are connected to a motor starter bus. Each of a plurality of motor switch gear units are configured to be coupled to the motor starter bus through a motor start relay and to be coupled to the motor power bus through a motor run relay. The motor switch gear units are coupled to one or more electric motors that provide prime mover rotating power to blender pumps or to hydraulic power packs which in turn supply rotating power to blender pumps. For example, when a motor coupled to a motor switch gear unit is desired to be running, the motor start relay associated with that motor switch gear unit is closed, supplying electric power from the one or more motor soft starters to gently power on the motor and bring it up to operating speed. When the motor reaches nominal operating speed, the motor start relay associated with that motor switch gear unit is opened, and the motor run relay associated with that motor switch gear unit is closed, supplying continuous electric power from the motor power bus to run the motor via that motor switch gear.

The motor start relays and the motor run relays may be controlled by a control module such as a computer, a control system, or a programmable logic controller (PLC). The motor start relays may be operated such that only one motor switch gear unit is coupled to the motor starter bus at one time. The use of a motor starter bus that can be used to start different motors at different times allows reducing the capital costs of providing motor soft starters for each separate motor.

Turning now to FIG. 1, a fracturing spread 100 is described. In an embodiment, the fracturing spread 100 comprises one or more wellbores 101, a power distribution unit (PDU) 102, a cable transport unit 104, a manifold 106, a plurality of fracturing pump trucks 108, and a blender power unit (BPU) 110. The fracturing spread 100 may comprise an express blending trailer (EBT) 112, a fluid management trailer (FMT) 114, one or more clear boost pumps (CBPs) 116, and one or more transport trucks 118. The PDU 102 may be trailer mounted or skid mounted. The cable transport unit 104 may be trailer mounted or skid mounted. The fracturing spread 100 may comprise a plurality of fracturing water tanks 120. The fracturing spread 100 may comprise a fork lift 122 that moves sand containers 126 for mounting onto the EBT 112 for blending sand with clear fluids to make fracturing fluid. In an embodiment, the fork lift 122 may drive about on a plurality of wooden pads 124 commonly referred to as "the dance floor." In an embodiment, the fracturing spread 100 comprises a technical command center (TCC) 128 and a logging truck 130. The TCC 128 may be trailer mounted or skid mounted.

Figure 2:
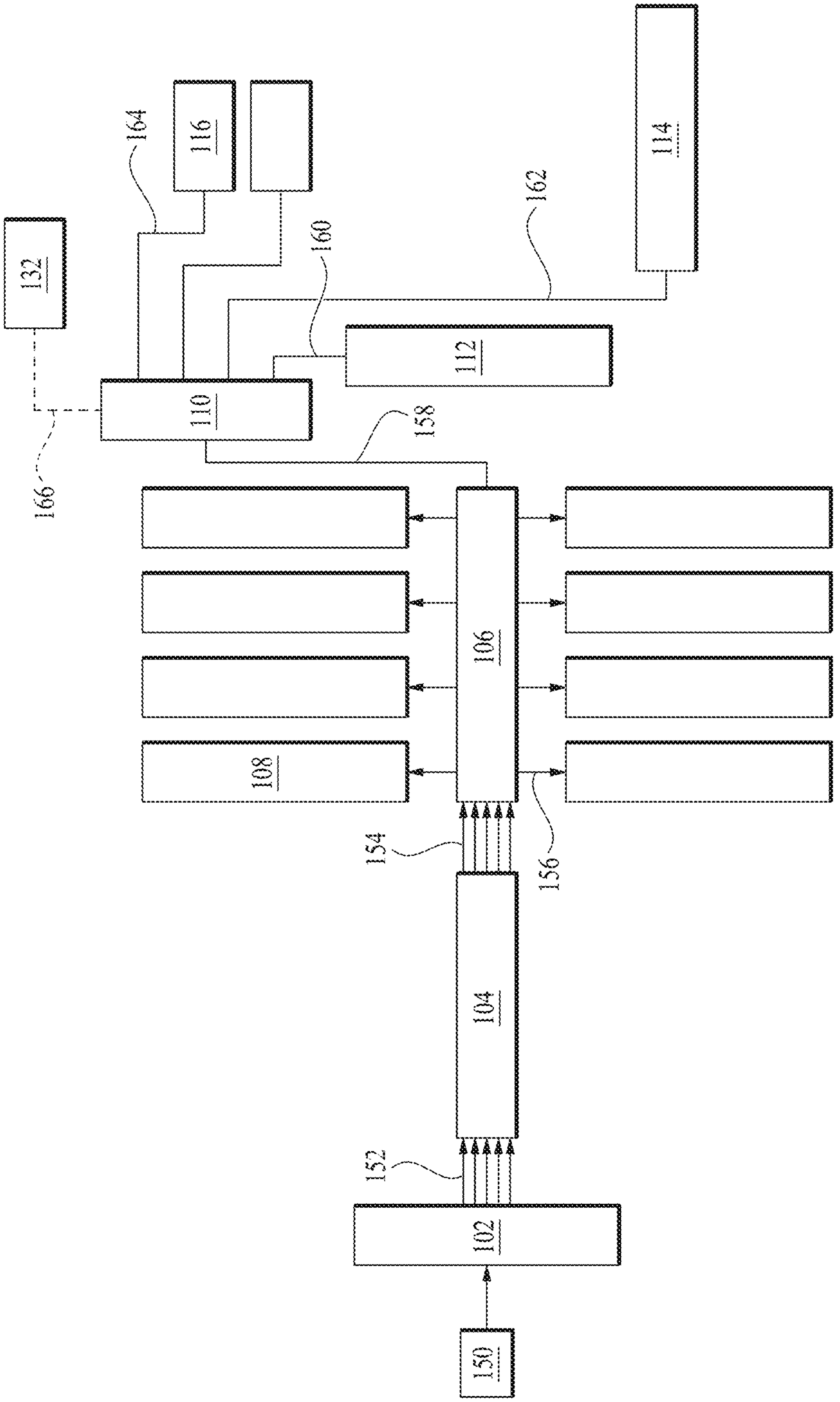
FIG. 2 is an illustration of electrical power distribution of a fracturing well stimulation job equipment spread according to an embodiment of the disclosure.

FIG. 1 is largely provided to enumerate the main items of equipment included in the fracturing spread 100 and not to illustrate fluid flow lines. The PDU 102 is illustrated as providing electric power (e.g., via the arrows in FIG. 1) to the manifold 106, and the manifold 106 routes this PDU 102 supplied electric power to the BPU 110. The flow of electric power from the PDU 102 to the fracturing pump trucks 108 is illustrated in FIG. 2 and described with reference to FIG. 2 below. The BPU 110 provides electric power to the EBT 112, to the FMT 114, and to the CBPs 116.

The manifold 106 operates as a fluid manifold as well as an electric power distribution hub. Low pressure fracturing fluid may be pumped by the EBT 112 to a low pressure side of the manifold 106, and the manifold 106 may distribute this low pressure fracturing fluid to fracturing pumps mounted on the fracturing pump trucks 108. The low pressure fracturing fluid may exhibit a pressure from 0 PSI to 250 PSI, for example about 175 PSI to about 225 PSI. The fracturing pumps on the fracturing pump trucks 108 pump high pressure fracturing fluid to a high pressure side of the manifold 106, and the manifold 106 routes this high pressure fracturing fluid into the one of the wellbores 101 undergoing the fracturing job. In an embodiment, the manifold 106 may route high pressure fracturing fluid to more than one of the wellbores 101 concurrently in some situations. The high pressure fracturing fluid (e.g., fracturing fluid output by the fracturing pumps mounted on the fracturing pump trucks 108) may exhibit a pressure from 0 PSI to 30,000 PSI, for example about 7,000 PSI to 15,000 PSI, or about 7,000 PSI to 25,000 PSI, or about 18,000 PSI to about 22,000 PSI, or about 19,000 PSI to about 21,000 PSI.

The TCC 128 may provide facilities for fracturing operators to control the fracturing job via one or more workstations. The TCC 128 may receive sensor outputs from various equipment in the fracturing spread 100, including the logging truck 130, and present readouts of some of these sensor outputs on one or more workstations. Workstations and/or control systems in the TCC 128 may be used to set control parameters of the PDU 102, the fracturing pump trucks 108, the BPU 110, the EBT 112, the FMT 114, and the CBPs 116. Workstations and/or control systems in the TCC 128 may be used to control fluid flow valves at various locations in the fracturing spread 100. The TCC 128 may provide wireless and/or wired communications to different fracturing personnel located around the fracturing spread 100 as well as wireless and/or wired communications to a regional and/or central office of the energy company and/or fracturing service company.

In an embodiment, the fracturing spread 100 optionally comprises an electric power source 132 that provides electric power to the BPU 110 (e.g., instead of the PDU 102 providing electric power to the BPU 110). In this embodiment, the PDU 102 and the cable transport unit 104 may not be part of the fracturing spread 100, and the fracturing pump trucks 108 may comprise diesel engines that provide prime mover torque to fracturing pumps. The electric power source 132 may be a connection to an electric power grid. The electric power source 132 may be a generator that receives rotating power from an internal combustion engine such as a diesel engine or a gasoline engine or from a natural gas turbine engine. Thus, the BPU 110 provides flexibility to energy companies that do not want to rely entirely upon electric power for all fracturing equipment.

Turning now to FIG. 2, electric power distribution in the fracturing spread 100 is described. Electrical power may be provided by an electric power source 150 to the PDU 102. The electric power source 150 may be electric grid power or a generator that receives rotating power from an internal combustion engine such as a diesel engine or a gasoline engine or from a natural gas turbine engine. The PDU 102 transmits electric power via a plurality of cables 152 to the cable transport unit 104, and the cable transport unit 104 transmits electric power via a plurality of cables 154 to the manifold 106. In an embodiment, the cable transport unit 104 simply provides a vehicle for transporting the cables to the location of the fracturing spread 100 and a pass-through point for electric power distribution.

The manifold 106 provides electric power to the fracturing pump trucks 108 via a plurality of cables 156 and to the BPU 110 via one or more cables 158. In an embodiment, each fracturing pump truck 108 is provided 13,800 VAC electric power via a first cable from the manifold 106, 480 VAC electric power via a second cable from the manifold 106, and a control signal via a third cable from the manifold 106. In another embodiment, electric power may be provided to the fracturing pump trucks 108 having different voltage levels than those listed here.

In an embodiment, the BPU 110 is provided 13,800 VAC electric power by the manifold 106 via one or more cables 158. Alternatively, in an embodiment, the BPU 110 is provided 13,800 VAC electric power by the electric power source 132 via one or more cables 166. In another embodiment, electric power may be provided to the BPU 110 having a voltage level different from 13,800 VAC, and a transformer in the BPU 110 may step this received voltage up or step this received voltage down to 4,160 VAC or some other desired voltage level. In an embodiment, the transformer in the BPU 110 may step received voltage down to 3,700 VAC to 4,700 VAC.

In an embodiment, the BPU 110 is provided electric power at a voltage in the range of 11,000 VAC to 16,000 VAC by the manifold 106 via one or more cables 158. In an embodiment, the electric power source 132 may be electric grid power and may be sourced to the BPU 110 at a voltage in the range from 11,000 VAC to 16,000 VAC via one or more cables 166. In an embodiment, the electric power sourced to the BPU 110 has a frequency of between 55 Hz and 65 Hz. In an embodiment, the electric power sourced to the BPU 110 has a frequency of about 60 Hz. In an embodiment, the electric power sourced to the BPU 110 has a frequency of between 45 Hz and 55 Hz. In an embodiment, the electric power sourced to the BPU 110 has a frequency of about 50 Hz.

The BPU 110 provides electric power to the EBT 112 via one or more cables 160, to the FMT 114 via one or more cables 162, and to the CBPs 116 via one or more cables 164. The BPU 110 provides electric power at a variety of different voltage levels to different motors and loads. The BPU 110, for example, may provide 4,160 VAC to hydraulic power packs mounted on the EBT 112 and/or on the FMT 114. The BPU 110 may provide 4,160 VAC or 480 VAC to the CBPs 116. The BPU 110 may provide 480 VAC, 240 VAC, and 120 VAC to various auxiliary motors and electric loads such as cooling fan motors, battery charger motors, and other devices. It is understood that in a different embodiment, different levels of voltage than those enumerated above may be provided by the BPU 110 to the EBT 112, to the FMT 114, to the CBPs 116, and other auxiliary electrical equipment.

Figure 3:
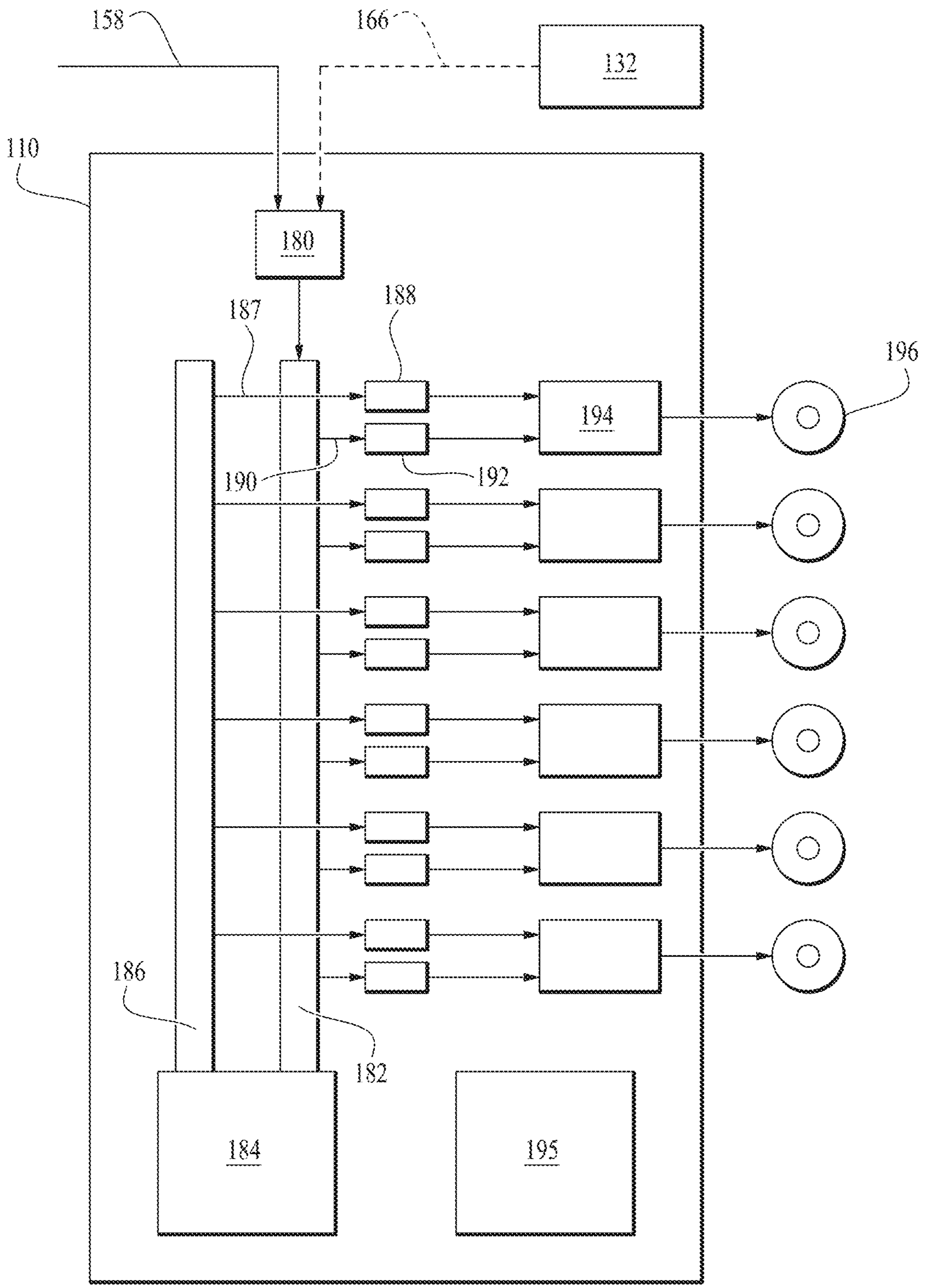
FIG. 3 is an illustration of electrical power distribution by a blender power unit (BPU) according to an embodiment of the disclosure.

Turning now to FIG. 3, further details of the BPU 110 are described. The BPU 110 comprises one or more electric power transformers 180 to convert an input voltage level to one or more different output voltage levels. The electric power transformer 180 may be referred to as a step-down transformer in some contexts. The input voltage may be provided from the PDE 102 via cable 158 or alternatively from the electric power source 132 via cable 166. In an embodiment, the transformer 180 is configured to receive electric power via an input at a first voltage in the range 11,000 VAC to 16,000 VAC. In an embodiment, the transformer is configured to output electric power via a first output at a second voltage in the range 3,700 VAC to 4,700 VAC to a motor power bus 182. The one or more electric transformers 180 may have moveable taps which allow for changing the level of received input voltage while still delivering desired nominal output voltages such as 4,160 VAC, 480 VAC, 240 VAC, and/or 120 VAC to electrical loads.

In an embodiment, the transformer 180 is configured to output electric power via a second output at a third voltage in the range 350 VAC to 550 VAC. In an embodiment, the transformer 180 is configured to output electric power via a third output at a fourth voltage in the range 180 VAC to 280 VAC. In an embodiment, the transformer 180 is configured to output electric power via a fourth output at a fifth voltage in the range 90 VAC to 140 VAC. For example, a first tap of the transformer 180 may be adjusted to deliver the second voltage via the first output, a second tap of the transformer 180 may be adjusted to deliver the third voltage via the second output, a third tap of the transformer 180 may be adjusted to deliver the fourth voltage via the third output, and a fourth tap of the transformer 180 may be adjusted to deliver the fifth voltage via the fourth output. One side or conductor of all of the outputs may be connected to a ground tap or a reference tap of the transformer 180.

The BPU 110 comprises one or more motor power buses 182 that are configured to receive electric power from an output of the transformer 180. For example, a motor power bus 182 may receive 4,160 VAC from an output of the transformer 180. The BPU 110 comprises one or more motor soft starters 184 that are configured to receive electric power from the motor power bus 182. The BPU 110 comprises a motor starter bus 186 that is configured to receive electric power from the one or more soft starter 184.

A motor soft starter is a device used to gently start an AC electric motor to reduce stress when starting the motor. The use of soft starters can extend the life of electric motors as well as of electric power cables. In the absence of soft starters, inrush current to a motor may be seven to ten times higher than normal running current, and starting torque may be three times higher than running torque. Use of a soft starter can gently speed up an electric motor until it reaches nominal working speed and avoid high inrush current and extreme start-up torque. Use of a soft starter can significantly reduce electric motor heating, thereby extending the service life of the electric motor. A motor soft starter may use one or more thyristors or silicon controlled rectifiers (SCRs) to reduce the voltage supplied to electric motors during starting. In an embodiment, the BPU 110 may employ one or more variable frequency drives (VFDs) in lieu of soft starters to perform start of electric motors.

The BPU 110 may be mounted on a trailer that can be pulled behind a truck or semi-tractor to be transported to the location of the fracturing spread 100. The BPU 110 may be mounted on a moveable skid, transported to the fracturing spread 100 on a truck or trailer, and then off-loaded on location. When brought to the location of the fracturing spread 100, electric power from the PDU 102 via electric cable 158 or from electric source 132 via electric cable 166 may be connected to the BPU 110 at the transformer 180 input.

During operation, the BPU 110 may be connected via a switch gear 194 in the BPU 110 to an electric motor 196 external to the BPU 110. A plurality of switch gears 194 may be provided to connect the BPU 110 to a plurality of electric motors 196, one switch gear 194 connecting the BPU 110 to one electric motor 196. In an embodiment, one or more of the electric motors 196 may provide prime mover power to one or more electric hydraulic power packs. In an embodiment, an electric hydraulic power pack supplies rotational power to a blender that blends clean fluid with sand to form a fracturing fluid. In an embodiment, one or more of the electric motors 196 may provide torque to pumps associated with the EBT 112, the FMT 114, and/or clean boost pumps 116. In an embodiment, at least one of the electric motors 196 supplies torque to a centrifugal pump.

During start of the electric motor 196, a start electric power relay 188 that is connected to the motor starter bus 186 may be commanded closed, thereby providing electric power from the soft starter 184 via the start electric power relay 188 to the switch gear 194, and from the switch gear 194 to the electric motor 196 to gently bring the electric motor 196 up to nominal speed. After the electric motor 196 has reached nominal speed or nearly reached nominal speed, the start electric power relay 188 may be commanded open, removing electric power sourced by the motor starter bus 186 from the switch gear 194 and therefore removing electric power sourced by the motor starter bus 186 from the electric motor 196. After the start electric power relay 188 has been commanded open, an electric power relay 192 may be commanded closed, thereby providing electric power from the motor power bus 182 via the electric power relay 192 to the switch gear 194, and from the switch gear 194 to the electric motor 196. The electric motor 196 may continue to receive electric power via the electric power relay 192 from the motor power bus 182 until it is desired to turn off the electric motor 196, for example at the completion of a fracturing operation. In the description above of the operation of the start electric power relays 188 and the electric power relays 192 that when a relay is in an open state, it does not provide a path for electric power to pass through the relay, and when a relay is in a closed state, it does provide a path for electric power to pass through the relay.

In an embodiment, a controller 195 located in the BPU 110 may send command signals to the start electric power relays 188 and to the electric power relays 192 to start the electric motors 196 and shut-off the electric motors 196 as desired, for example in response to commands from the TCC 128 or in response to operator commands in the BPU 110, for example pushbuttons. The controller 195 may be implemented as a computer, a control system, a PLC, or another intelligent electronic device. The controller 195 may be programmed with data and/or instructions that the controller 195 interprets or executes to perform its controlling functions.

The controller 195 may manage the start electric power relays 188 such that only one of the electric motors 196 is being started at one time. Additionally, the controller 195 may manage the start electric power relays 188 and the electric power relays 192 such that the start electric power relay 188 opens before the electric power relay 192 associated with a same electric motor 196 closes. Said in other words, the controller 195 may manage start electric power relays 188 and electric power relays 192 such that the start electric power relay 188 and the electric power relay 192 for the same electric motor 196 are never closed concurrently. By providing electric starting power from the motor starter bus 186, a single or a small number of soft starters 184 may be leveraged across a plurality of electric motors 196, reducing capital costs of the BPU 110 and also conserving limited space within the physical volume of the BPU 110.

In an embodiment, the electric motors 196 powered by the BPU 110 may be about the same size and manufactured by the same manufacturer. In another embodiment, however, at least some of the electric motors 196 may be different from others of the electric motors 196 and may desirably be started using different start-up regimes. The controller 195 may store information about the different start-up regimes of different electric motors 196. During start-up of the electric motors 196, the controller 195 accordingly may configure different starting settings associated with the different start-up regimes into the soft starters 184. Prior to start-up of a first electric motor 196, the controller 195 may configure a first start-up regime into the soft starter 184 and then command the start-up of the first electric motor 196; prior to start-up of a different second electric motor 196, the controller 195 may configure a second start-up regime into the soft starter 184—where the second start-up regime is different from the first start-up regime—and then command the start-up of the second electric motor 196. In this way, the soft starters 184 can perform different start-up regimes adapted to different electric motors 196.

Figure 4:
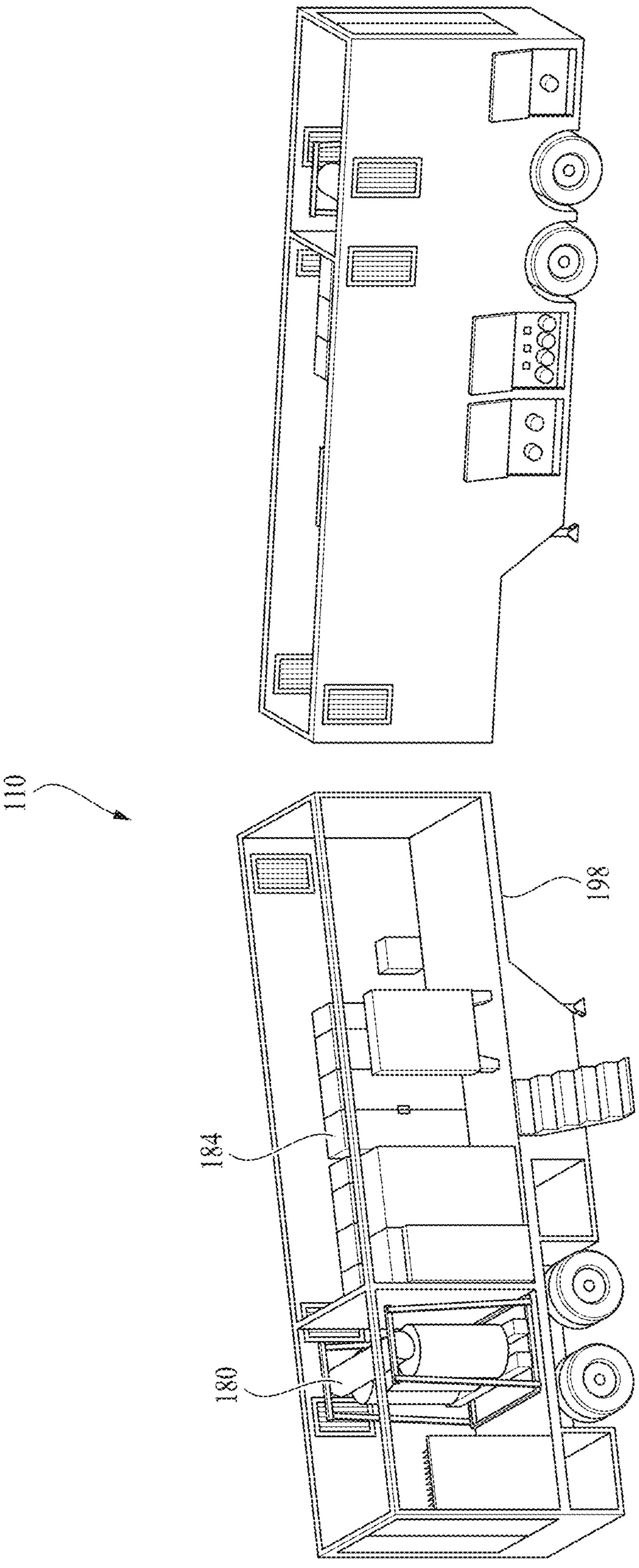
FIG. 4 is an illustration of a blender power unit installed in a transportable trailer according to an embodiment of the disclosure.

Turning now to FIG. 4, a trailer mounted BPU 110 is described. The components of the BPU 110 described above may be mounted on a trailer 198. Alternatively, in another embodiment, the BPU 110 may be mounted on a skid.

Figure 5:
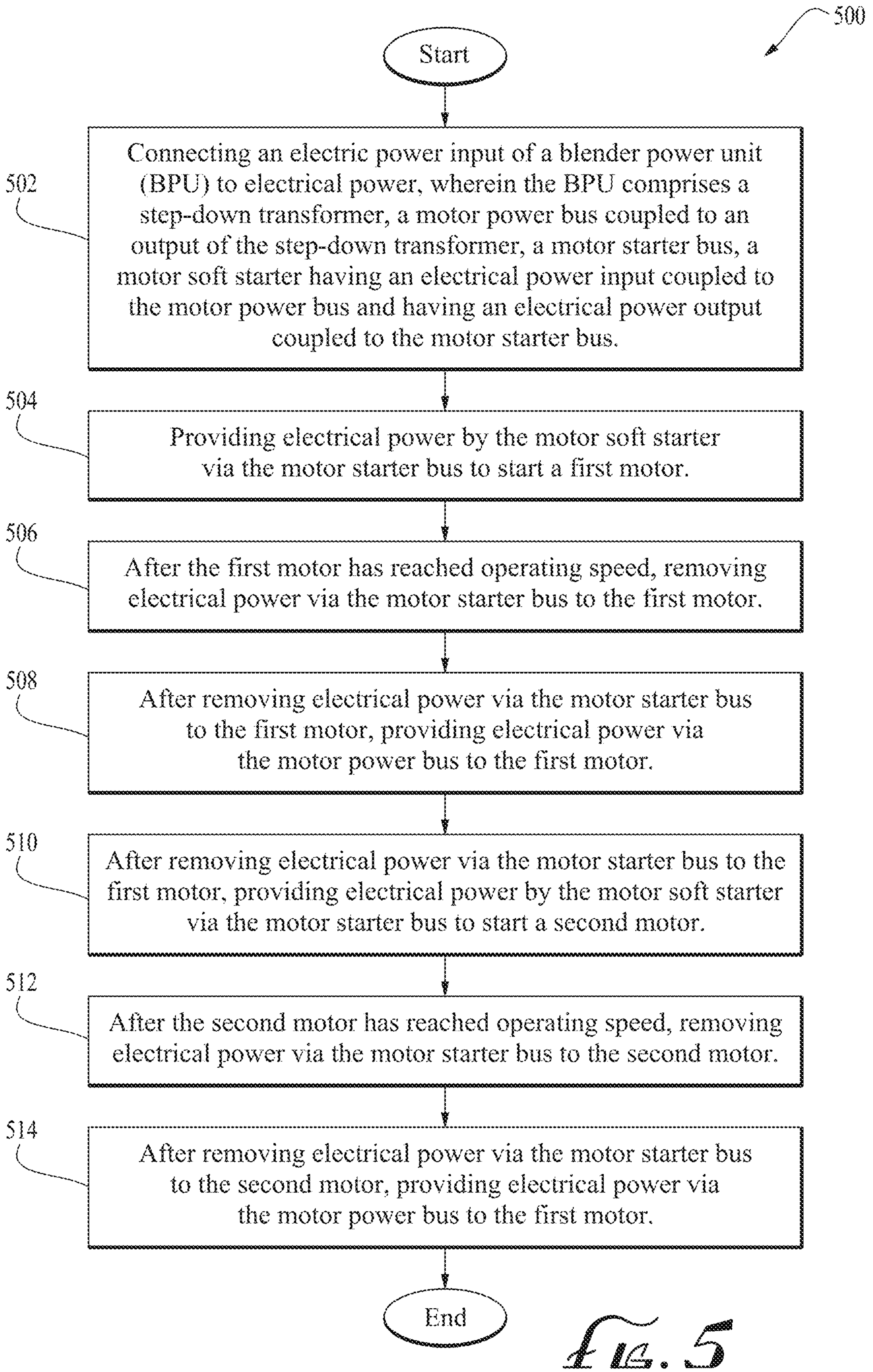
FIG. 5 is a flow chart of a method according to an embodiment of the disclosure.

Turning now to FIG. 5, a method 500 is described. In an embodiment, the method 500 is a method of stimulating a wellbore with a fracturing job. At block 502, the method 500 comprises connecting an electric power input of a blender power unit (BPU) to electrical power, wherein the BPU comprises a step-down transformer, a motor power bus coupled to an output of the step-down transformer, a motor starter bus, a motor soft starter having an electrical power input coupled to the motor power bus and having an electrical power output coupled to the motor starter bus. In an embodiment, connecting the electric power input of the BPU to electrical power comprises connecting the electric power input of the BPU to a manifold that receives electrical power from a power distribution unit (PDU) that provides electrical power to fracturing pump trucks. In an embodiment, connecting the electric power input of the BPU to electrical power comprises connecting the electric power input of the BPU to an electric power grid. In an embodiment, connecting the electric power input of the BPU to electrical power comprises connecting the electric power input of the BPU to a generator.

In an embodiment, the method 500 further comprises stepping down a first voltage level received at the electric power input of the BPU by the step-down transformer to a second voltage level provided as the output of the step-down transformer, wherein the first voltage is in the range 11,000 VAC to 16,000 VAC and the second voltage is in the range 3,700 VAC to 4,700 VAC. In an embodiment, the method 500 further comprises stepping down the first voltage level by the step-down transformer to a third voltage level, wherein the third voltage level is in the range 350 VAC to 550 VAC. In an embodiment, the method 500 further comprises stepping down the first voltage level by the step-down transformer to a fourth voltage level, wherein the fourth voltage level is in the range 180 VAC to 280 VAC. In an embodiment, the method 500 further comprises stepping down the first voltage level by the step-down transformer to a fifth voltage level, wherein the fifth voltage level is in the range 90 VAC to 140 VAC. In an embodiment, the first voltage has a frequency of between 55 Hz and 65 Hz. In an embodiment, the first voltage has a frequency of about 60 Hz. In an embodiment, the first voltage has a frequency of between 45 Hz and 55 Hz. In an embodiment, the first voltage has a frequency of about 50 Hz.

At block 504, the method 500 comprises providing electrical power by the motor soft starter via the motor starter bus to start a first motor. At block 506, the method 500 comprises, after the first motor has reached operating speed, removing electrical power via the motor starter bus to the first motor. At block 508, the method 500 comprises, after removing electrical power via the motor starter bus to the first motor, providing electrical power via the motor power bus to the first motor.

At block 510, the method 500 comprises after removing electrical power via the motor starter bus to the first motor, providing electrical power by the motor soft starter via the motor starter bus to start a second motor. At block 512, the method 500 comprises, after the second motor has reached operating speed, removing electrical power via the motor starter bus to the second motor. At block 514, the method 500 comprises, after removing electrical power via the motor starter bus to the second motor, providing electrical power via the motor power bus to the first motor. In an embodiment, the first motor is associated with a clean boost pump to supply fluid to a blender and the second motor is associated with the blender or the first motor is associated with the blender and the second motor is associated with the clean boost pump to supply fluid to the blender.

Figure 6:
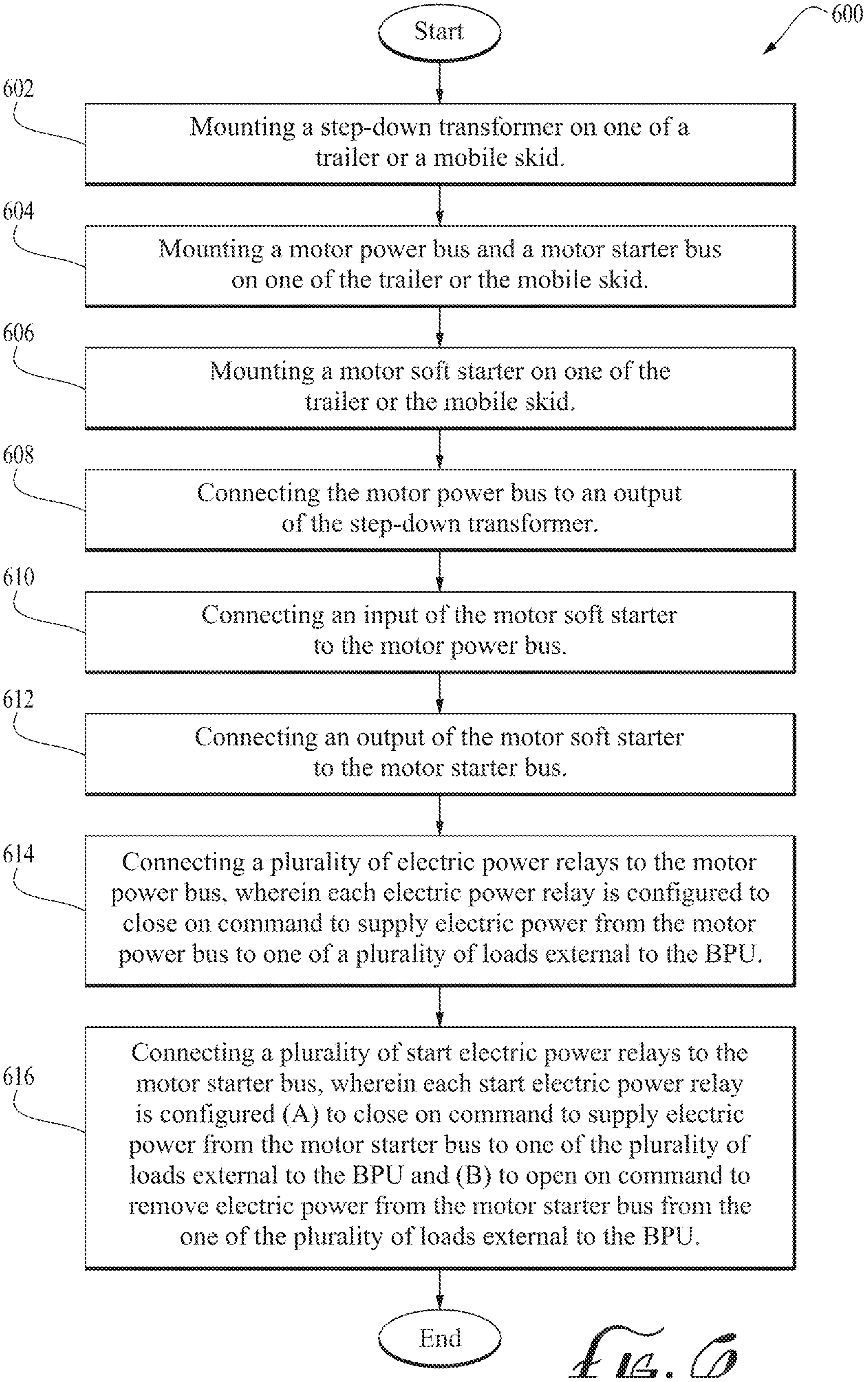
FIG. 6 is a flow chart of a method according to an embodiment of the disclosure.

Turning now to FIG. 6, a method 600 is described. In an embodiment, the method 600 is a method of assembling a blender power unit (BPU) for use in fracturing well stimulation jobs. At block 602, the method 600 comprises mounting a step-down transformer on one of a trailer or a mobile skid. At block 604, the method 600 comprises mounting a motor power bus and a motor starter bus on one of the trailer or the mobile skid. At block 606, the method 600 comprises mounting a motor soft starter on one of the trailer or the mobile skid.

At block 608, the method 600 comprises connecting the motor power bus to an output of the step-down transformer. At block 610, the method 600 comprises connecting an input of the motor soft starter to the motor power bus. At block 612, the method 600 comprises connecting an output of the motor soft starter to the motor starter bus.

At block 614, the method 600 comprises connecting a plurality of electric power relays to the motor power bus, wherein each electric power relay is configured to close on command to supply electric power from the motor power bus to one of a plurality of loads external to the BPU. At block 616, the method 600 comprises connecting a plurality of start electric power relays to the motor starter bus, wherein each start electric power relay is configured (A) to close on command to supply electric power from the motor starter bus to one of the plurality of loads external to the BPU and (B) to open on command to remove electric power from the motor starter bus from the one of the plurality of loads external to the BPU.

In an embodiment, the method 600 further comprises mounting a controller on one of the trailer or the mobile skid; communicatively coupling a first plurality of outputs of the controller to control inputs of the electric power relays; and communicatively coupling a second plurality of outputs of the controller to control inputs of the start electric power relays. In an embodiment, the controller is configured to exclude more than one start electric power relay being commanded closed at the same time. In an embodiment, the controller is configured to command a first one of the start electric power relays associated with an electric motor that is off to close, to monitor a starting state of the electric motor associated with the first start electric power relay, to command the first start electric power relay open based on the starting state of the electric motor, and, after commanding the first start electric power relay open, to command a first one of the electric power relays associated with the electric motor to close.

In an embodiment, the method 600 further comprises adjusting the step-down transformer to receive input electric power at a first voltage level and to output electric power at a second voltage level to the output of the step-down transformer. In an embodiment, the first voltage is in the range 11,000 VAC to 16,000 VAC and the second voltage is in the range 3,700 VAC to 4,700 VAC. In an embodiment, the method 600 further comprises adjusting the step-down transformer to receive input electric power at a frequency of between 55 Hz and 65 Hz. In an embodiment, the method 600 further comprises adjusting the step-down transformer to receive input electric power at a frequency of about 60 Hz. In an embodiment, the method 600 further comprises adjusting the step-down transformer to receive input electric power at a frequency of between 45 Hz and 55 Hz. In an embodiment, the method 600 further comprises adjusting the step-down transformer to receive input electric power at a frequency of about 50 Hz.

ADDITIONAL DISCLOSURE

The following are non-limiting, specific embodiments in accordance with the present disclosure:

A first embodiment, which is a blender power unit (BPU) for use in fracturing well stimulation jobs, comprising: a step-down transformer having an input and an output and configured to receive electrical power via the input at a first voltage from a power distribution unit (PDU), from a turbine driven generator, from a diesel driven generator, or from a grid power source and to output electrical power via the output at a second voltage that is lower than the first voltage; a motor power bus coupled to the output of the step-down transformer; a motor starter bus; at least one motor soft starter having an electrical power input coupled to the motor power bus and having an electrical power output coupled to the motor starter bus, wherein each motor soft starter is configured to continuously control voltage output to the motor starter bus to gently accelerate electric motors during motor start-up; a plurality of electric power relays coupled to the motor power bus and configured to supply electric power from the motor power bus to a load when in a closed state; and a plurality of start electric power relays coupled to the motor starter bus and configured to supply electric power from the motor starter bus to a load when in a closed state.

A second embodiment, which is the BPU of the first embodiment, wherein the BPU is mounted on a trailer or on a moveable skid.

A third embodiment, which is the BPU of the first or the second embodiment, wherein at least one of the plurality of electric power relays and at least one of the start electric power relays is connected to an electric hydraulic power pack that supplies power to a blender.

A fourth embodiment, which is the BPU of the third embodiment, wherein the blender blends clean fluid with sand to form a fracturing fluid.

A fifth embodiment, which is the BPU of any of the first through the fourth embodiment, wherein at least one of the plurality of electric power relays and at least one of the start electric power relays is connected to an electric motor that supplies torque to a centrifugal pump.

A sixth embodiment, which is the BPU of any of the first through the fifth embodiment, wherein the step-down transformer is configured to output electric power via the output at the second voltage in the range 3,700 VAC to 4,700 VAC to the motor power bus.

A seventh embodiment, which is the BPU of any of the first through the sixth embodiment, wherein the step-down transformer is configured to output electric power via the output at the second voltage in about 4,160 VAC to the motor power bus.

An eighth embodiment, which is the BPU of any of the first through the seventh embodiment, wherein the step-down transformer is configured to receive electric power via the input at the first voltage in the range 11,000 VAC to 16,000 VAC.

A ninth embodiment, which is the BPU of any of the first through the eighth embodiment, wherein the step-down transformer is configured to receive electric power via the input at the first voltage of about 13,800 VAC.

A tenth embodiment, which is the BPU of any of the first through the ninth embodiment, wherein the step-down transformer is configured to receive electric power via the input at a frequency of between 55 Hz and 65 Hz.

An eleventh embodiment, which is the BPU of the tenth embodiment, wherein the step-down transformer is configured to receive electric power via the input at a frequency of about 60 Hz.

A twelfth embodiment, which is the BPU of any of the first through the ninth embodiment, wherein the step-down transformer is configured to receive electric power via the input at a frequency of between 45 Hz and 55 Hz.

A thirteenth embodiment, which is the BPU of the twelfth embodiment, wherein the step-down transformer is configured to receive electric power via the input at a frequency of about 50 Hz.

A fourteenth embodiment, which is the BPU of any of the first through the thirteenth embodiment, wherein the output of the step-down transformer is provided by a first tap of the step-down transformer and a ground tap of the step-down transformer.

A fifteenth embodiment, which is the BPU of any of the first through the fourteenth embodiment, wherein the step-down transformer is configured to output electric power via a second output at a third voltage in the range 350 VAC to 550 VAC.

A sixteenth embodiment, which is the BPU of the fifteenth embodiment, wherein the step-down transformer is configured to output electric power via the second output at the third voltage at about 480 VAC.

A seventeenth embodiment, which is the BPU of the fifteenth embodiment or the sixteenth embodiment, wherein the second output of the step-down transformer is provided by a second tap of the step-down transformer and a ground tap of the step-down transformer.

An eighteenth embodiment, which is the BPU of any of the first through the seventeenth embodiment, wherein the step-down transformer is configured to output electric power via a third output at a fourth voltage in the range 180-280 VAC.

A nineteenth embodiment, which is the BPU of the eighteenth embodiment, wherein the step-down transformer is configured to output electric power via the third output at the fourth voltage at about 240 VAC.

A twentieth embodiment, which is the BPU of the eighteenth embodiment or the nineteenth embodiment, wherein the third output of the step-down transformer is provided by a third tap of the step-down transformer and a ground tap of the step-down transformer.

A twenty-first embodiment, which is the BPU of any of the first through the twentieth embodiment, wherein the step-down transformer is configured to output electric power via a fourth output at a fifth voltage in the range 90-140 VAC.

A twenty-second embodiment, which is the BPU of the twenty-first embodiment, wherein the step-down transformer is configured to output electric power via the fourth output at the fourth voltage at about 240 VAC.

A twenty-third embodiment, which is the BPU of the twenty-first embodiment or the twenty-second embodiment, wherein the fourth output of the step-down transformer is provided by a fourth tap of the step-down transformer and a ground tap of the step-down transformer.

A twenty-fourth embodiment, which is a method of stimulating a wellbore with a fracturing job, comprising connecting an electric power input of a blender power unit (BPU) to electrical power, wherein the BPU comprises a step-down transformer, a motor power bus coupled to an output of the step-down transformer, a motor starter bus, a motor soft starter having an electrical power input coupled to the motor power bus and having an electrical power output coupled to the motor starter bus; providing electrical power by the motor soft starter via the motor starter bus to start a first motor; after the first motor has reached operating speed, removing electrical power via the motor starter bus to the first motor; after removing electrical power via the motor starter bus to the first motor, providing electrical power via the motor power bus to the first motor; after removing electrical power via the motor starter bus to the first motor, providing electrical power by the motor soft starter via the motor starter bus to start a second motor; after the second motor has reached operating speed, removing electrical power via the motor starter bus to the second motor; and after removing electrical power via the motor starter bus to the second motor, providing electrical power via the motor power bus to the first motor.

A twenty-fifth embodiment, which is the method of stimulating a wellbore of the twenty-fourth embodiment, wherein the BPU is configured according to any of the first through the twenty-third embodiment.

A twenty-sixth embodiment, which is the method of stimulating a wellbore of the twenty-fourth or the twenty-fifth embodiment, wherein the first motor is associated with a clean boost pump to supply fluid to a blender and the second motor is associated with the blender or the first motor is associated with the blender and the second motor is associated with the clean boost pump to supply fluid to the blender.

A twenty-seventh embodiment, which is the method of any of the twenty-fourth through the twenty-sixth embodiment, wherein connecting the electric power input of the BPU to electrical power comprises connecting the electric power input of the BPU to a manifold that receives electrical power from a power distribution unit (PDU) that provides electrical power to fracturing pump trucks.

A twenty-eighth embodiment, which is the method of any of the twenty-fourth through the twenty-seventh embodiment, wherein connecting the electric power input of the BPU to electrical power comprises connecting the electric power input of the BPU to an electric power grid.

A twenty-ninth embodiment, which is the method of any of the twenty-fourth through the twenty-eighth embodiment, wherein connecting the electric power input of the BPU to electrical power comprises connecting the electric power input of the BPU to a generator.

A thirtieth embodiment, which is the method of any of the twenty-fourth through the twenty-ninth embodiment, further comprising stepping down a first voltage level received at the electric power input of the BPU by the step-down transformer to a second voltage level provided as the output of the step-down transformer, wherein the first voltage is in the range 11,000 VAC to 16,000 VAC and the second voltage is in the range 3,700 VAC to 4,700 VAC.

A thirty-first embodiment, which is the method of any of the twenty-fourth through the twenty-ninth embodiment, further comprising stepping down the first voltage level by the step-down transformer to a third voltage level, wherein the third voltage level is in the range 350 VAC to 550 VAC.

A thirty-second embodiment, which is the method of any of the twenty-fourth through the thirty-first embodiment, further comprising stepping down the first voltage level by the step-down transformer to a fourth voltage level, wherein the fourth voltage level is in the range 180 VAC to 280 VAC.

A thirty-third embodiment, which is the method of any of the twenty-fourth through the thirty-second embodiment, further comprising stepping down the first voltage level by the step-down transformer to a fifth voltage level, wherein the fifth voltage level is in the range 90 VAC to 140 VAC.

A thirty-fourth embodiment, which is a method of assembling a blender power unit (BPU) for use in fracturing well stimulation jobs, comprising mounting a step-down transformer on one of a trailer or a mobile skid; mounting a motor power bus and a motor starter bus on one of the trailer or the mobile skid; mounting a motor soft starter on one of the trailer or the mobile skid; connecting the motor power bus to an output of the step-down transformer; connecting an input of the motor soft starter to the motor power bus; connecting an output of the motor soft starter to the motor starter bus; connecting a plurality of electric power relays to the motor power bus, wherein each electric power relay is configured to close on command to supply electric power from the motor power bus to one of a plurality of loads external to the BPU; and connecting a plurality of start electric power relays to the motor starter bus, wherein each start electric power relay is configured (A) to close on command to supply electric power from the motor starter bus to one of the plurality of loads external to the BPU and (B) to open on command to remove electric power from the motor starter bus from the one of the plurality of loads external to the BPU.

A thirty-fifth embodiment, which is the method of the thirty-fourth embodiment, wherein the BDU is configured according to any of the first through the twenty-third embodiment.

A thirty-sixth embodiment, which is the method of the thirty-third or the thirty-fourth embodiment, further comprising adjusting the step-down transformer to receive input electric power at a first voltage level and to output electric power at a second voltage level to the output of the step-down transformer.

A thirty-seventh embodiment, which is the method of the thirty-sixth embodiment, wherein adjusting the step-down transformer to output electric power at the second voltage level to the output of the step-down transformer comprises adjusting a first tap of the step-down transformer.

A thirty-eighth embodiment, which is the method of any of the thirty-fourth through the thirty-seventh embodiment, wherein the first voltage is in the range 11,000 VAC to 16,000 VAC and the second voltage is in the range 3,700 VAC to 4,700 VAC.

A thirty-ninth embodiment, which is the method of any of the thirty-fourth through the thirty-eighth embodiment, further comprising adjusting a second tap of the step-down transformer to provide a third voltage at a second output of the step-down transformer, wherein the third voltage is in the range 350 VAC to 550 VAC.

A fortieth embodiment, which is the method of any of the thirty-fourth through the thirty-ninth embodiment, further comprising adjusting a third tap of the step-down transformer to provide a fourth voltage at a third output of the step-down transformer, wherein the fourth voltage is in the range 180 VAC to 280 VAC.

A forty-first embodiment, which is the method of any of the thirty-fourth through the fortieth embodiment, further comprising adjusting a fourth tap of the step-down transformer to provide a fifth voltage at a fourth output of the step-down transformer, wherein the fifth voltage is in the range 90 VAC to 140 VAC.

A forty-second embodiment, which is the method of any of the thirty-fourth through the forty-first embodiment, further comprising mounting a controller on one of the trailer or the mobile skid; communicatively coupling a first plurality of outputs of the controller to control inputs of the electric power relays; and communicatively coupling a second plurality of outputs of the controller to control inputs of the start electric power relays.

A forty-third embodiment, which is the method of the forty-second embodiment, wherein the controller is a computer.

A forty-fourth embodiment, which is the method of the forty-second embodiment, wherein the controller is a control system.

A forty-fifth embodiment, which is the method of the forty-second embodiment, wherein the controller is a programmable logic controller (PLC).

A forty-sixth embodiment, which is the method of any of the forty-second through the forty-fifth embodiment, wherein the controller is configured to exclude more than one start electric power relay being commanded closed at the same time.

A forty-seventh embodiment, which is the method of any of the forty-second through the forty-sixth embodiment, wherein the controller is configured to command a first one of the start electric power relays associated with an electric motor that is off to close, to monitor a starting state of the electric motor associated with the first start electric power relay, to command the first start electric power relay open based on the starting state of the electric motor, and, after commanding the first start electric power relay open, to command a first one of the electric power relays associated with the electric motor to close.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An electrical power distribution system for use in fracturing well stimulation jobs, comprising:

a step-down transformer having an input and an output and configured to receive electrical power via the input at a first voltage and to output electrical power via the output at a second voltage that is lower than the first voltage;

a motor power bus coupled to the output of the step-down transformer;

a motor starter bus;

at least one motor soft starter having an electrical power input coupled to the motor power bus and having an electrical power output coupled to the motor starter bus, wherein the system is configured to connect a motor to the motor starter bus when bringing the motor up to operating speed and is configured to connect the motor to the motor power bus when the motor is up to operating speed.

2. The system of claim 1, wherein the step-down transformer is configured to receive electrical power via the input at a first voltage from a power distribution unit (PDU), from a turbine driven generator, from an internal combustion engine driven generator, or from a grid power source.

3. The system of claim 1, wherein each motor soft starter is configured to continuously control voltage output to the motor starter bus to gently accelerate electric motors during motor start-up.

4. The system of claim 1, further comprising one or more electric power relays coupled to the motor power bus and configured to supply electric power from the motor power bus to a load when in a closed state; and one or more start electric power relays coupled to the motor starter bus and configured to supply electric power from the motor starter bus to a load when in a closed state.

5. The system of claim 4, wherein at least one of the one or more electric power relays and at least one of the one or more start electric power relays is connected to an electric hydraulic power pack that supplies power to a blender.

6. The system of claim 5, wherein the blender blends clean fluid with sand to form a fracturing fluid.

7. The system of claim 4, wherein at least one of the one or more electric power relays and at least one of the one or more start electric power relays is coupled to an electric hydraulic power pack that supplies power to a clean boost pump.

8. The system of claim 4, wherein at least one of the one or more electric power relays and at least one of the one or more start electric power relays is coupled to an electric motor that supplies torque to a centrifugal pump.

9. The system of claim 1, wherein the system is mounted on a trailer or on a moveable skid.

10. A method of stimulating a wellbore with a fracturing job, comprising:

coupling an electric power input of an electrical power distribution system to electrical power, wherein the electrical power distribution system comprises a step-down transformer, a motor power bus coupled to an output of the step-down transformer, a motor starter bus, one of a motor soft starter or a variable frequency drive (VFD) having an electrical power input coupled to the motor power bus and having an electrical power output coupled to the motor starter bus;

providing electrical power by the motor soft starter or the VFD via the motor starter bus to start a first motor;

removing electrical power from the motor starter bus from the first motor;

after removing electrical power from the motor starter from the first motor, providing electrical power via the motor power bus to the first motor.

11. The method of claim 10, further comprising:

after removing electrical power from the motor starter bus from the first motor, providing electrical power by the motor soft starter or the VFD via the motor starter bus to start a second motor;

removing electrical power from the motor starter bus from the second motor; and after removing electrical power via the motor starter bus from the second motor, providing electrical power via the motor power bus to the second motor.

12. The method of claim 11, wherein the first motor is associated with a clean boost pump to supply fluid to a blender and the second motor is associated with the blender or the first motor is associated with the blender and the second motor is associated with the clean boost pump to supply fluid to the blender.

13. The method of claim 10, wherein coupling the electric power input of the electrical power distribution system to electrical power comprises coupling the electric power input of the electrical power distribution system to a manifold that receives electrical power from a power distribution unit (PDU) that provides electrical power to fracturing pump trucks.

14. The method of claim 10, wherein coupling the electric power input of the electrical power distribution system to electrical power comprises coupling the electric power input of the electrical power distribution system to an electric power grid.

15. The method of claim 10, wherein coupling the electric power input of the electrical power distribution system to electrical power comprises coupling the electric power input of the electrical power distribution system to a generator.

16. A method of assembling an electrical power distribution system for use in fracturing well stimulation jobs, comprising:

mounting a step-down transformer on one of a trailer or a mobile skid;

mounting a motor power bus and a motor starter bus on one of the trailer or the mobile skid;

mounting a motor soft starter or a variable frequency drive (VFD0 on one of the trailer or the mobile skid;

coupling the motor power bus to an output of the step-down transformer;

coupling an input of the motor soft starter or VFD to the motor power bus;

coupling an output of the motor soft starter to the motor starter bus;

coupling one or more electric power relays to the motor power bus, wherein each electric power relay is configured to close on command to supply electric power from the motor power bus; and coupling one or more start electric power relays to the motor starter bus, wherein each start electric power relay is configured to close on command to supply electric power from the motor starter bus.

17. The method of claim 16, further comprising:

mounting a controller on one of the trailer or the mobile skid;

communicatively coupling a first plurality of outputs of the controller to control inputs of the one or more electric power relays; and communicatively coupling a second plurality of outputs of the controller to control inputs of the one or more start electric power relays.

18. An electrical power distribution system for use in fracturing well stimulation jobs, comprising:

a step-down transformer having an input and an output and configured to receive electrical power via the input at a first voltage and to output electrical power via the output at a second voltage that is lower than the first voltage;

a motor power bus coupled to the output of the step-down transformer;

a motor starter bus;

at least one variable frequency drive (VFD) having an electrical power input coupled to the motor power bus and having an electrical power output coupled to the motor starter bus, wherein the system is configured to connect a motor to the motor starter bus when bringing the motor up to operating speed and is configured to connect the motor to the motor power bus when the motor is up to operating speed.

19. The system of claim 18, wherein each VFD is configured to continuously control voltage and frequency output to the motor starter bus to gently accelerate electric motors during motor start-up.

20. The system of claim 18, wherein the system is mounted on a trailer or on a moveable skid.

* * * * *